United States Patent
Berlovan, Jr. et al.

(10) Patent No.: US 11,397,125 B2
(45) Date of Patent: Jul. 26, 2022

(54) WATER SENSOR WITH BRACKET MOUNT

(71) Applicant: Waxman Consumer Products Group Inc., Bedford Hts., OH (US)

(72) Inventors: Viorel Berlovan, Jr., Medina, OH (US); John C. Holzheimer, Chagrin Falls, OH (US); Martin D. Marsic, Highland Hts., OH (US)

(73) Assignee: LeakSmart, Inc., Bedford Hts., OH (US)

( * ) Notice: Subject to any disclaimer, the term of this patent is extended or adjusted under 35 U.S.C. 154(b) by 146 days.

(21) Appl. No.: 17/005,553

(22) Filed: Aug. 28, 2020

(65) Prior Publication Data

US 2021/0063268 A1 Mar. 4, 2021

Related U.S. Application Data

(60) Provisional application No. 62/892,628, filed on Aug. 28, 2019.

(51) Int. Cl.
*G01M 3/18* (2006.01)
*G01M 3/40* (2006.01)

(52) U.S. Cl.
CPC .............. *G01M 3/18* (2013.01); *G01M 3/40* (2013.01)

(58) Field of Classification Search
CPC ...... G01M 3/00; G01M 3/04; G01M 3/16–18; G01M 3/40
See application file for complete search history.

(56) References Cited

U.S. PATENT DOCUMENTS

| 6,941,829 B1 | 9/2005 | Long |
| 2005/0267698 A1 | 12/2005 | Gordon |
| 2007/0289635 A1 | 12/2007 | Ghazarian et al. |

FOREIGN PATENT DOCUMENTS

JP  0313264 B1 * 11/1991 ............. G01M 3/04

OTHER PUBLICATIONS

Moen W00317524_793740235 Water Leak Detector, 2022.*
Honeywell RCHW3610WF Water leak detector, 2022.*
*Wired vs. Wireless Water Leak Detection Systems*, HomePlus Leak Detection, https://www.a-leak-detector.com/wired-vs-wireless.php, pp. 1 and 2, copyright 2019 HomePlus Products Inc.
*Leak Defender for Well Pumps*, Water Security Solutions, https://wssus.com/product/leak-defender/, pp. 1-6.
*DCH-S161 Wi-Fi Water Sensor*, https://us.dlink.com/en/products/dch-s161-mydlink-wi-fi-water-sensor.

* cited by examiner

*Primary Examiner* — Nguyen Q. Ha
(74) *Attorney, Agent, or Firm* — Fay Sharpe LLP

(57) ABSTRACT

A water leak detection system including a leak detector and a wall bracket with an integral or removable remote probe that can be positioned remotely from the leak detector. The leak detector is configured to electrically couple with the remote probe when mechanically coupled with the wall bracket, requiring no further user interaction to activate the probe. The wall bracket can include multiple remote probes that each electrically couple with the leak detector when the leak detector is mechanically coupled to the wall bracket, any one of the remote probes capable of triggering the leak detector when a leak occurs.

18 Claims, 9 Drawing Sheets

WATER SENSOR WITH BRACKET MOUNT

CROSS REFERENCE TO RELATED PATENTS AND APPLICATIONS

This application claims priority to and the benefit of the filing date of U.S. Provisional Patent Application Ser. No. 62/892,628, filed Aug. 28, 2019, which application is hereby incorporated by reference.

FIELD

The present disclosure relates to a leak detector for detecting water leaks, and more particularly to a battery-powered leak detector having multiple electrode configurations.

BACKGROUND

A building, such as a house or commercial building, generally has a single water inlet pipe through which water is supplied to a network of pipes connected to various water fixtures and water consuming appliances. Water leaks can occur at a wide variety of locations within the structure but most typically at or near the fixtures or appliances themselves. When a leak develops and is not detected, severe property damage generally results and the leaking water can present safety issues.

Water leak detectors have been available for some time. These detectors are often battery powered and include a pair of electrodes that are situated to encounter water from a leak. When both electrodes are in a common water source (e.g., leakage), a circuit within the detector is completed via the water source and the detector is configured to generate an alert. The alert can be an audible or visual indicator. More recently, leak detectors have included wireless communication technology so that the detection of a leak can be communicated to a smart home hub or to a user via a mobile phone app or the like.

Water leaks are most often caused by failures of the water fixtures or failures within the appliances connected to the network of pipes. It is well known that leaks may occur at or near water fixtures and/or appliances such as refrigerators, water heaters, washing machines, pipes or hoses associated with such appliances, and toilets. Other common sources of leaks include frozen pipes, sump pumps, air conditioning condensate drains, and/or clogged drains. Roofs are also a common source or water leaks into structures.

Ideally, a leak detector could be placed at every location that may experience a leak. It should be appreciated, however, that the most economical approach to utilizing water leak detectors is to place a detector at the locations most likely to experience a leak, such as one or more of the locations listed above. For example, a user may wish to purchase only a handful of leak detectors and locate the leak detectors near the hot water tank, refrigerator, washing machine, and one or more toilets.

BRIEF DESCRIPTION

Aspects of the present disclosure are directed to a water leak detector that includes a wall bracket with an integral or removable remote probe that can be positioned remotely from the leak detector. The leak detector is configured to electrically couple with the remote probe when mechanically coupled with the wall bracket, requiring no further user interaction to activate the probe. The wall bracket can include multiple remote probes that each electrically couple with the leak detector when the leak detector is mechanically coupled to the wall bracket, any one of the remote probes capable of triggering the leak detector when a leak occurs. The multiple remote probes can be useful in locations where multiple potential leak sources are in relatively close proximity such as a bathroom (toilet, shower/shower drain, sink/sink drain) or kitchen (refrigerator, dishwasher, sink/sink drain). An orientation sensor in the leak detector can indicate when the leak sensor is being used with the remote probe by detecting when the leak detector is in a vertical orientation (e.g., when installed in the wall bracket).

In accordance with one aspect of the present disclosure, a leak detector system for detecting leaks comprises a leak detector having first and second electrodes, the leak detector configured to generate an alert when moisture is detected by the electrodes or when moisture is detected by a remote probe electrically coupled to the first and second electrodes, a wall bracket mountable to a surface, the wall bracket having a body with first and second terminals supported on the body, and a receptacle for receiving the leak detector. The first and second terminals of the wall bracket and the first and second electrodes of the leak detector are electrically coupled when the leak detector is received in the receptacle of the bracket.

The leak detector system can include at least one remote probe having first and second electrodes, the at least one remote probe can be electrically coupled to the terminals of the wall bracket such that the first and second electrodes of the at least one remote probe act as the first and second electrodes of the leak detector when the leak detector is received in the wall bracket. The at least one remote probe can be hardwired to the wall bracket, or can be removably coupled to the wall bracket, such as with mating male and female coaxial jacks. The terminals of the wall bracket can be biased in a direction to maintain contact with the electrodes of the leak detector, for example, with a spring element. A splitter can be interposed between the wall bracket and the at least one probe, the splitter being couplable to at least one additional remote probe. The leak detector can include leak detector circuitry configured to generate an alert when moisture is detected by the electrodes or when moisture is detected by a remote probe electrically coupled to the first and second electrodes, and the circuitry can include an orientation sensor for detecting an orientation of the leak detector and generating a signal indicative of said detected orientation, wherein the leak detector circuitry uses the signal to determine whether the leak detector is being used in conjunction with the wall bracket. The wall bracket can have first and second side flanges extending from a base wall of the body on opposite edges thereof, the side flanges being generally concave, and the leak detector can have convex side walls adapted to be accommodated by the side flanges when the leak detector is in the receptacle of the wall bracket. A distal end of each side flange can be recurved to facilitate alignment and acceptance of the leak detector into the receptacle of the wall bracket. The wall bracket can further include a bottom flange extending from the base wall between the first and second side flanges.

In accordance with another aspect, a wall bracket for a leak detection system comprises a body with first and second terminals supported by the body, and a receptacle for receiving an associated leak detector of the leak detector system. The first and second terminals of the wall bracket are configured to electrically couple with first and second electrodes of the associated leak detector when the associated leak detector is received in the receptacle of the wall bracket.

The bracket can include at least one remote probe having first and second electrodes, wherein the at least one remote probe is electrically coupled to the terminals of the wall bracket, whereby the first and second electrodes of the at least one remote probe act as the first and second electrodes of the associated leak detector when the leak detector is received in the wall bracket. The terminals of the wall bracket can be biased by spring elements in a direction to maintain contact with the electrodes of the associated leak detector. The wall bracket can have first and second side flanges extending from a base wall of the body on opposite edges thereof, the side flanges being generally concave. The wall bracket can further include a bottom flange extending from the base wall between the first and second side flanges.

In accordance with another aspect, a method of installing a leak detection system comprises mounting a wall bracket to a surface, the wall bracket having a body with first and second terminals supported on the body, and a receptacle for receiving a leak detector, coupling first and second electrodes of a leak detector to the terminals of the wall bracket by inserting the leak detector into the receptacle of the wall bracket, and positioning a remote probe connected to the wall mount in a location for detecting moisture in said location, the remote probe having first and second electrodes. The at least one remote probe can be electrically coupled to the terminals of the wall bracket, whereby the first and second electrodes of the at least one remote probe act as the first and second electrodes of the associated leak detector.

DETAILED DESCRIPTION

Figure 1:
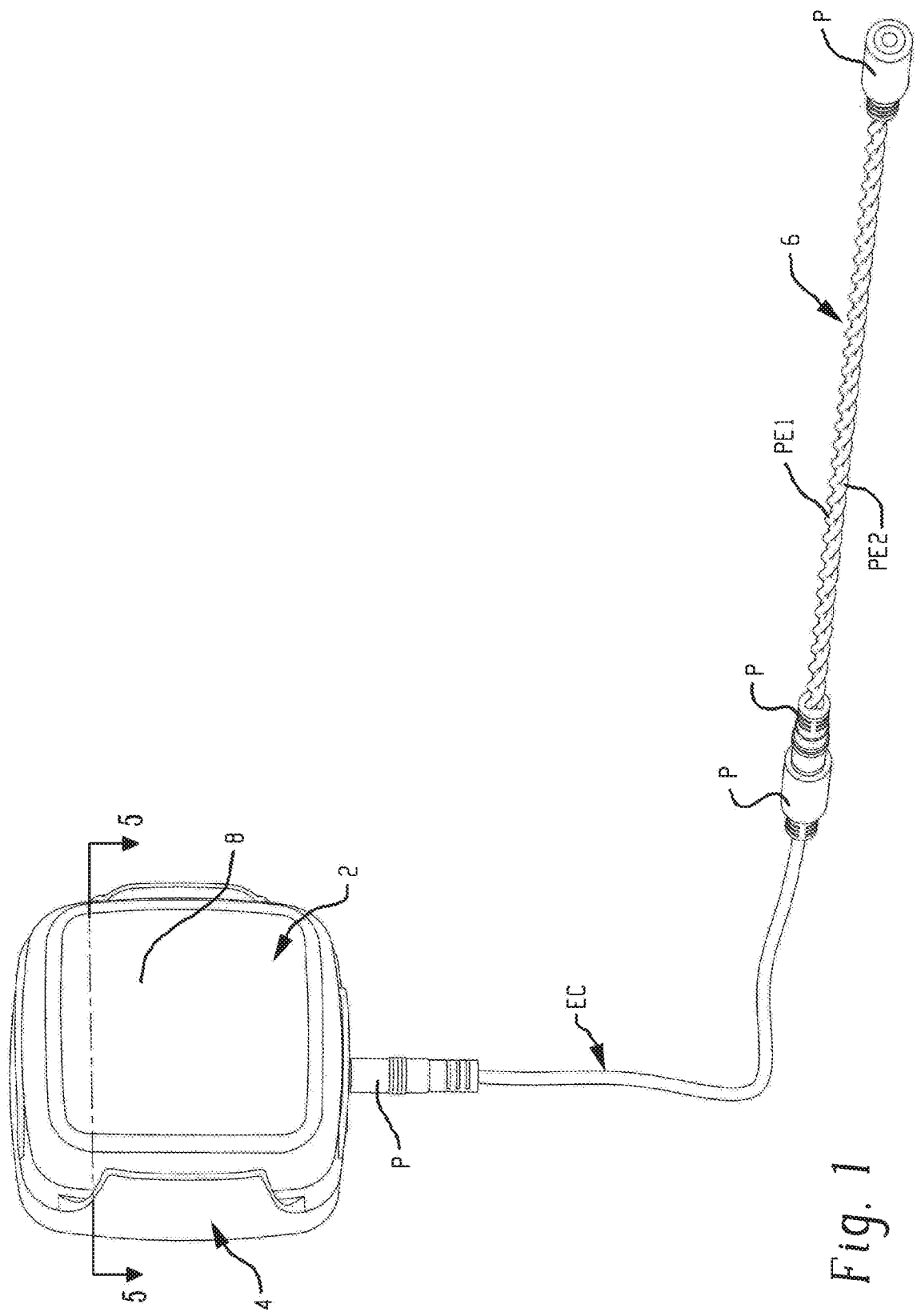
FIG. 1 is a perspective view of an exemplary leak detection system including a leak detector and wall bracket in accordance with the present disclosure.
Figure 2:
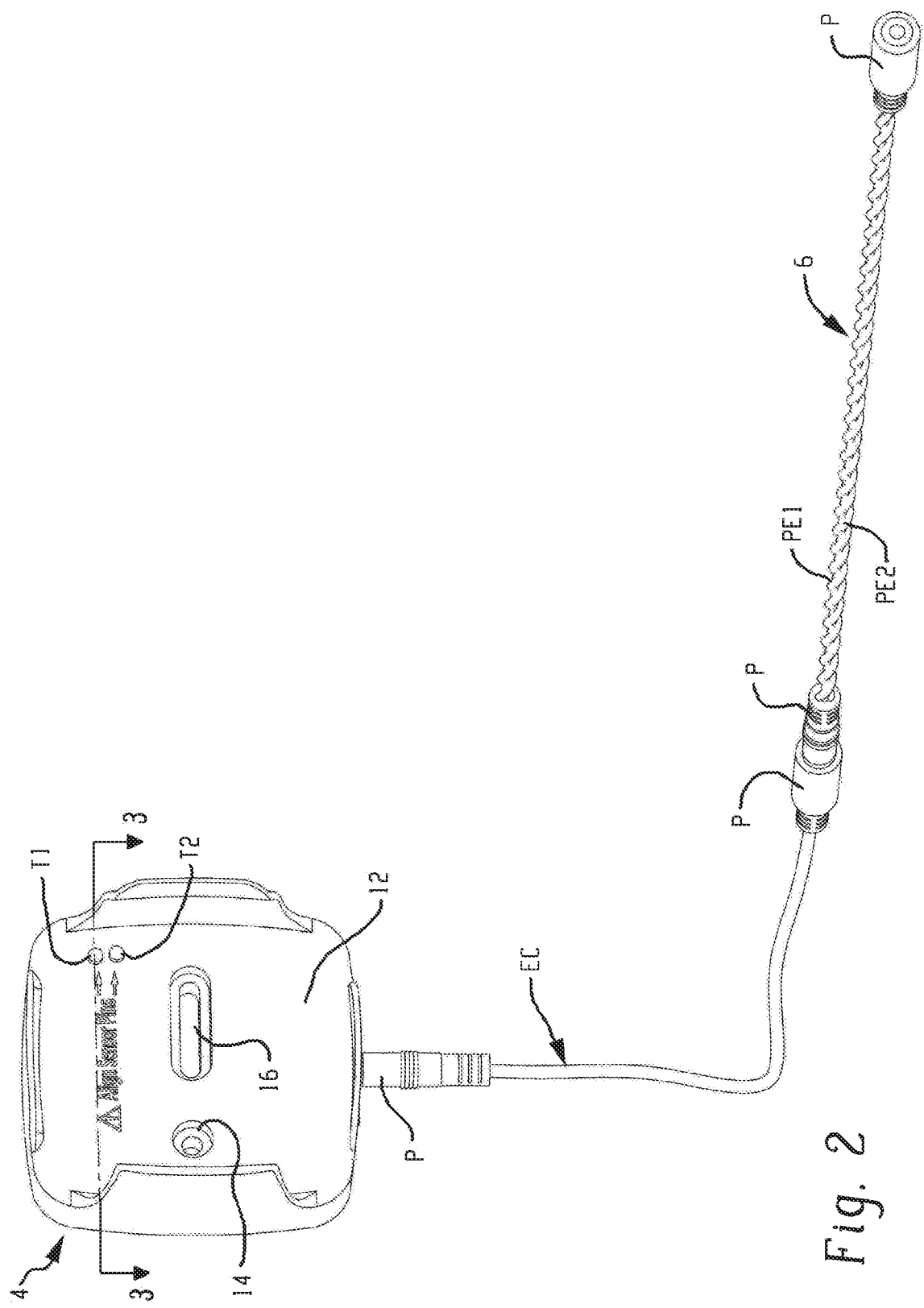
FIG. 2 is a perspective view of the wall bracket of FIG. 1.
Figure 3:
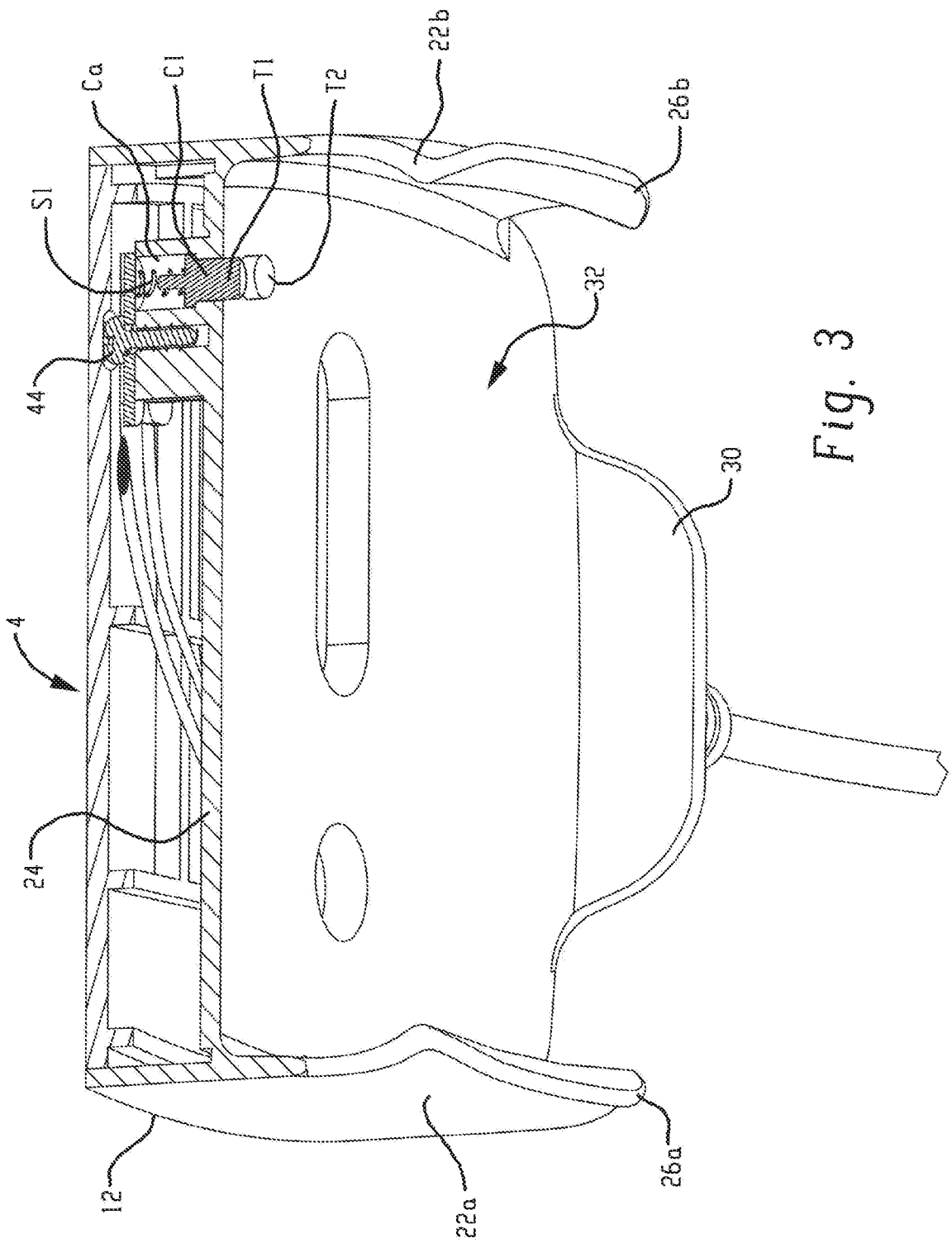
FIG. 3 is a cross-sectional view of the wall bracket taken along the line 3-3 in FIG. 2.
Figure 4:
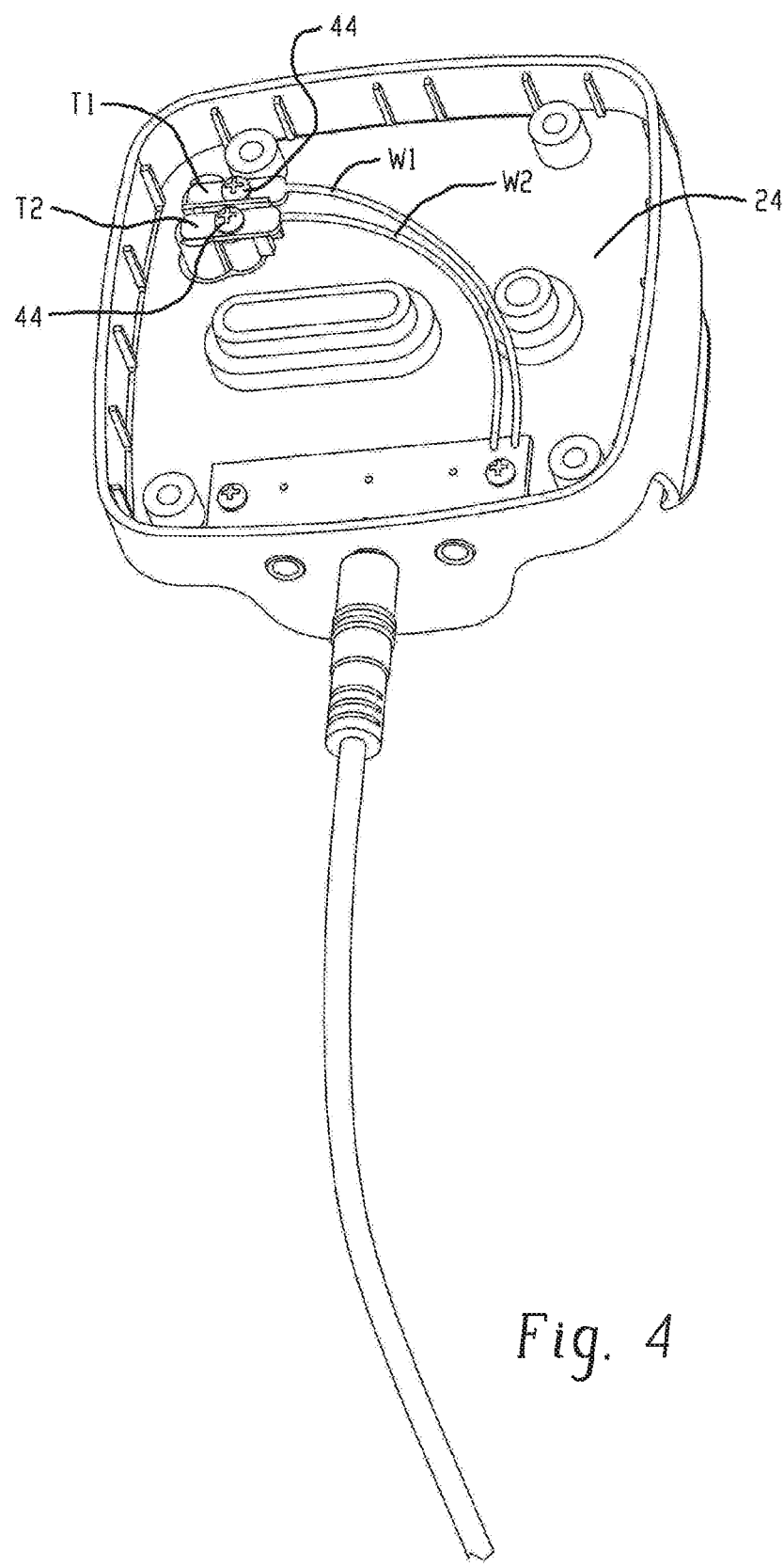
FIG. 4 is a rear perspective view of the wall bracket.

Turning to the FIGURES, and initially to FIGS. 1 and 2, a leak detection system is illustrated and includes a leak detector 2 and wall bracket 4 having a remote probe 6 are illustrated. The leak detector 2 generally includes a housing 8 that is adapted to be received in the wall bracket 4 as shown in FIG. 1. The wall bracket 4 generally includes a body 12 mountable to a wall or other surface via a mounting hole 14 and a mounting slot 16 configured to receive fasteners, such as screws (not shown), for securing the wall bracket 4 to a surface.

The remote probe 6 includes a pair of probe electrodes PE1/PE2 and is coupled to the body 12 via an extension cable EC. In this embodiment, the probe electrodes PE1/PE2 are in the form of a twisted pair of wires/conductors separated by an absorbent insulator. This configuration of the remote probe is typically referred to as leak detection rope. When exposed to water, the absorbent insulator material absorbs the water and thereby electrically couples the first and second probe electrodes PE1/PE2. In other embodiments, the remote probe can take the form of a spot probe having discrete first and second electrodes (e.g., point electrodes) that are configured to detect moisture in a single location. In the illustrated embodiment, the remote probe 6 is removably connectable to the wall bracket 4 via cooperating male/female plugs P (e.g., 3.5 mm jack, RCA-style jack etc.). In other embodiments, the remote probe 6 can be hardwired to the wall bracket 4. In addition, the optional extension cable EC is shown.

With additional reference to FIGS. 3-6, the body 12 of the wall bracket 4 includes first and second side flanges 22a and 22b extending from a base wall 24 of the body 12 on opposite edges thereof. The side flanges 22a and 22b are generally concave to accommodate a corresponding convex side wall of the leak detector 2. A distal end 26a/26b of each flange 22a and 22b is recurved to facilitate alignment and insertion of the leak detector 2 during installation, as will be described in more detail below. A bottom flange 30 extends from the base wall 24 between the first and second side flanges 22a and 22b. Together, the base wall 24, side flanges 22a and 22b and bottom flange 26 form a receptable 32 for receiving the leak detector 2.

In accordance with the present disclosure, the wall bracket 4 includes a pair of terminals T1/T2 that are configured to electrically couple with the electrodes E1/E2 of the leak detector 2 when the leak detector 2 is mechanically coupled to the wall bracket 4, thereby activating the probe electrodes PE1/PE2 of the remote probe 6. Each of the pair of terminals T1/T2 are supported on a back side of the base wall 24 of the wall bracket 4 by fasteners 44, and electrically coupled to a respective wire W1/W2. Wires W1/W2 are in turn electrically coupled to a cooperating port P of the wall bracket 4 for connection to remote probe 6.

Each of the terminals T1/T2 in this embodiment include a spring-loaded contact element C1/C2 (only C1 visible in FIG. 3) for contacting a respective electrode E1/E2 of the leak detector 2. To this end, each terminal T1/T2 includes a spring S1/S2 (only S1 visible in FIG. 3) for biasing the spring-loaded contact elements C1/C2. The springs S1/S2 and contact elements C1/C2 are supported in a respective cavity Ca of the wall bracket 4. The spring-loaded contacts C1/C2 assist in maintaining electrical coupling between the wall bracket 4 and the leak detector 2.

Figure 5:
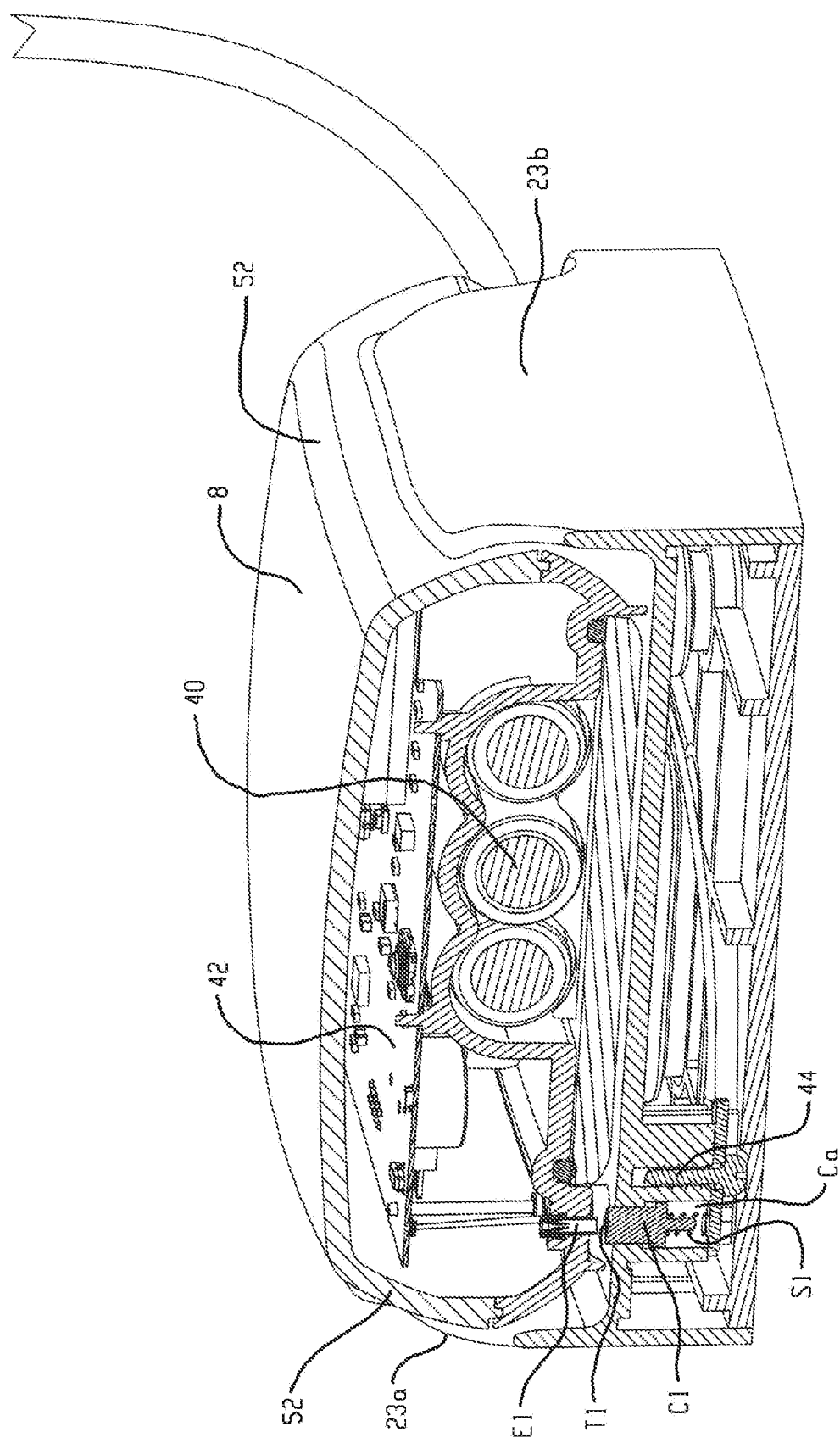
FIG. 5 is a cross-sectional view of the leak detector coupled with the wall bracket taken along the line 5-5 in FIG. 1.

With reference to FIG. 5, the leak detector 2 includes a power source 40 (e.g., batteries) and circuitry 42 for detecting a leak and generating an alert and/or communicating the detection of a leak wirelessly to a hub or other receiver. The particular details of the leak detector internals are exemplary in nature and it will be appreciated that aspects of the present disclosure can be used with virtually any type of leak detector. In some embodiments, the circuitry 42 can include a microprocessor, an orientation sensor, a proximity sensor, temperature sensor, humidity sensor, microphone, speaker, ultrasonic microphone, ultrasonic speaker, communication circuitry, etc. The leak detector 2 in the exemplary embodiment includes a pair of electrodes E1/E2 on a bottom side thereof. The pair of electrodes E1/E2 are configured to engage a surface upon which the leak detector 2 is supported for detecting a leak when the leak detector 2 is used without the wall bracket 4. As will be appreciated, if a common source of water contacts both of the electrodes E1/E2 the leak detector 2 is configured to generate an alert indicative of a leak.

It should now be appreciated that the leak detector 2 can be used in a stand-alone configuration where electrodes E1/E2 can be used for detecting a leak (e.g., leak detector placed on horizontal surface such as a floor), or the leak detector 2 can be used in conjunction with the wall bracket 4 where electrodes PE1/PE2 of the remote probe 6 can be used for detecting a leak.

Figure 6:
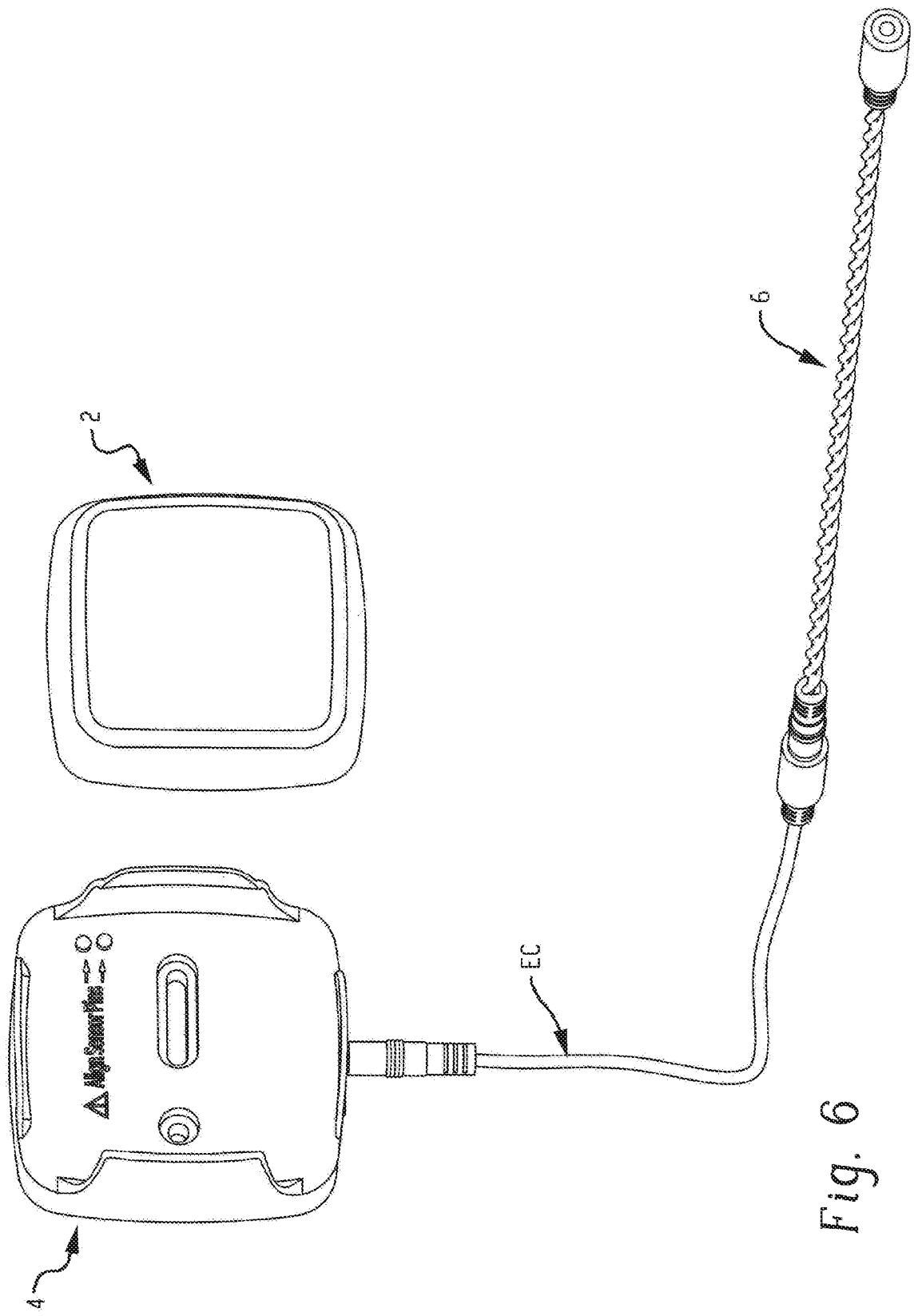
FIG. 6 is a perspective view of the leak detector and wall bracket in an uncoupled state.

As shown in FIG. 6, to convert the leak detector 2 from stand-alone use to use with a remote probe 6, the leak detector 2 is simply aligned with the receptacle 32 of the wall bracket 4 and pressed into placed. As will be appreciated, the side flanges 22a and 22b of the wall bracket 4 are configured to resiliently deflect outwardly as the leak detector 2 is pressed into place. Upon full seating of the leak detector 2 in the receptacle 32, the side flanges 22a/22b return to their original position thereby mechanically securing the leak detector 2 in the wall bracket 4. As best shown in FIG. 5, sidewalls 52 of the leak detector housing 8 have a convex profile adapted to be closely received in the concave side flanges 23a/23b. Meanwhile, the electrodes E1/E2 of the leak detector 2 are aligned and electrically coupled with the terminals T1/T2 of the wall bracket 4.

The wall bracket 4 of the present disclosure is advantageous over prior art leak detectors that employ a keyhole type slot for mounting to a wall. First, the wall bracket 4 of the present disclosure can be secured to a wall prior to inserting the leak detector 2 in the wall bracket 4. This allows an installer to insert the fasteners through the mounting hole 14 and/or mounting slot 16 and into the wall. This method of mounting is more intuitive and requires less precision that the prior art approach of first installing the fasteners and then aligning the keyhole in the leak detector with the fastener. In addition, embodiments having an integral remote probe 6 hardwired to the wall bracket 4 are not prone to accidental/inadvertent unplugging as are the prior art leak detectors that employ a plug type releasable connection (e.g., 3.5 mm jack). Also, the automatic electrical coupling of the remote probe 6 to the leak detector 2 upon mechanical coupling of the leak detector 2 with the wall bracket 4 makes installation simple and intuitive for a user.

Figure 7:
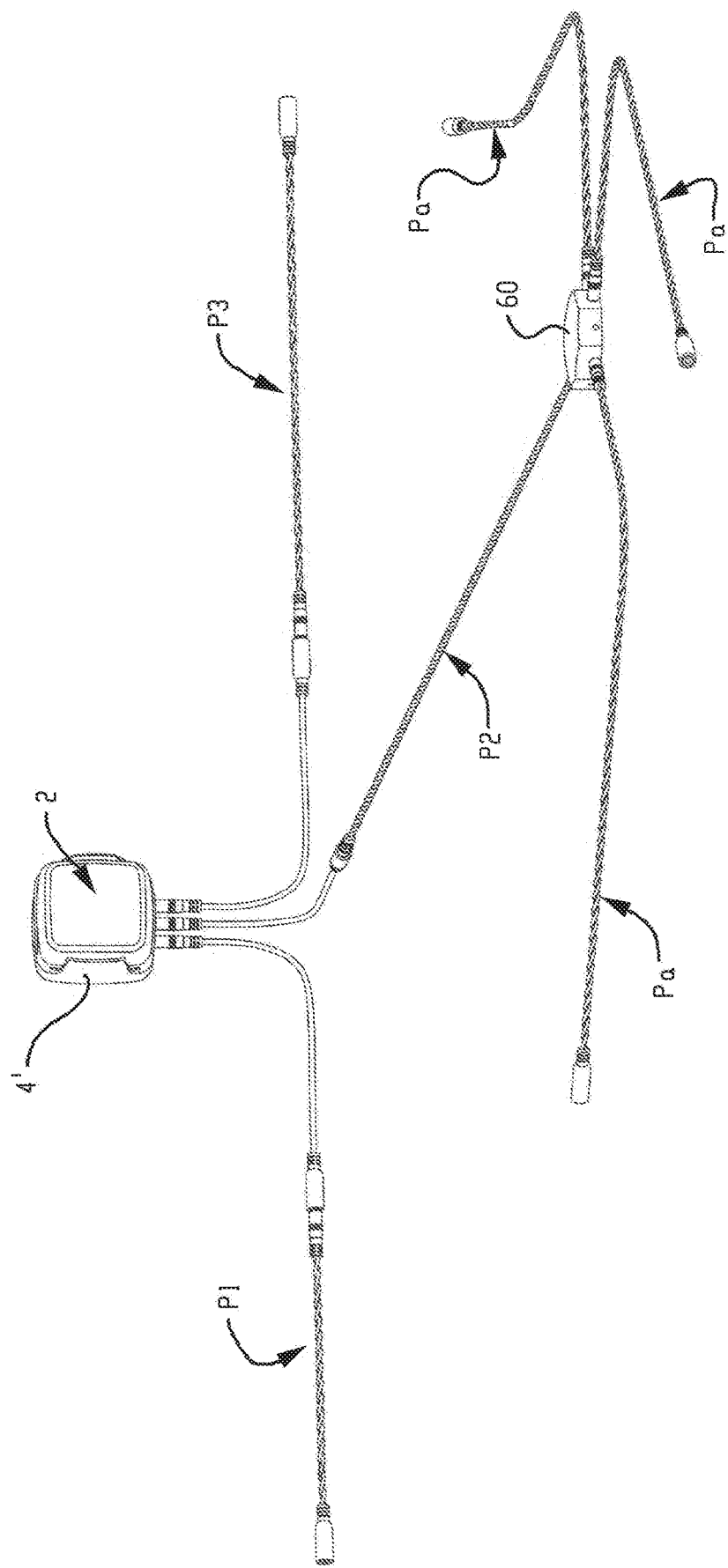
FIG. 7 is a perspective view of another exemplary leak detector system having a leak detector, wall bracket and a plurality of remote probes.

With reference to FIG. 7, it should be appreciated that any embodiment in accordance with the present disclosure can include more than one remote probe. For example, a leak detector 2 is shown in a wall bracket 4' having three remote probes P1/P2/P3. Each of the remote probes P1/P2/P3 are wired in parallel with the electrodes E1/E2 of the leak detector 2 when the leak detector 2 is mechanically coupled to the wall bracket 4'. Any one of the remote probes P1/P2/P3 can trigger the leak detector 2. In addition, remote probe P2 is further coupled to a splitter 60 that has multiple additional remote probes Pa coupled thereto. The additional remote probes Pa can be hardwired to the splitter 60 or the splitter 60 can include portsjacks etc. for removably coupling with the additional probes Pa.

The leak detector 2 can include an orientation sensor to detect whether the leak detector is in a horizontal position (e.g., placed on a floor or similar surface) or in a vertical position (e.g., in the wall bracket). In some applications, the leak detector can communicate information about its state of use to a hub or other receiver. This enables a user to identify which sensors are being used in conjunction with remote probes via the wall bracket. This can help facilitate system setup and can allow a user to more accurately respond to a leak notification.

It should also be appreciated that in some embodiments the wall bracket can include other types of remote probes besides the rope sensors and/or the point specific probes. Such other types of remote probes can include leak detection mats for detecting leaks in a larger area, and/or leak detectors that are incorporated into pans or other receptacle structures designed to capture and route leakage to electrodes. In other embodiments, combinations of different types of remote probes can be used. In one example, a wall bracket can include a leak detection rope to be used as a perimeter sensor to be installed around a perimeter of a basement, and a remote probe to be installed near a water heater.

Figure 8:
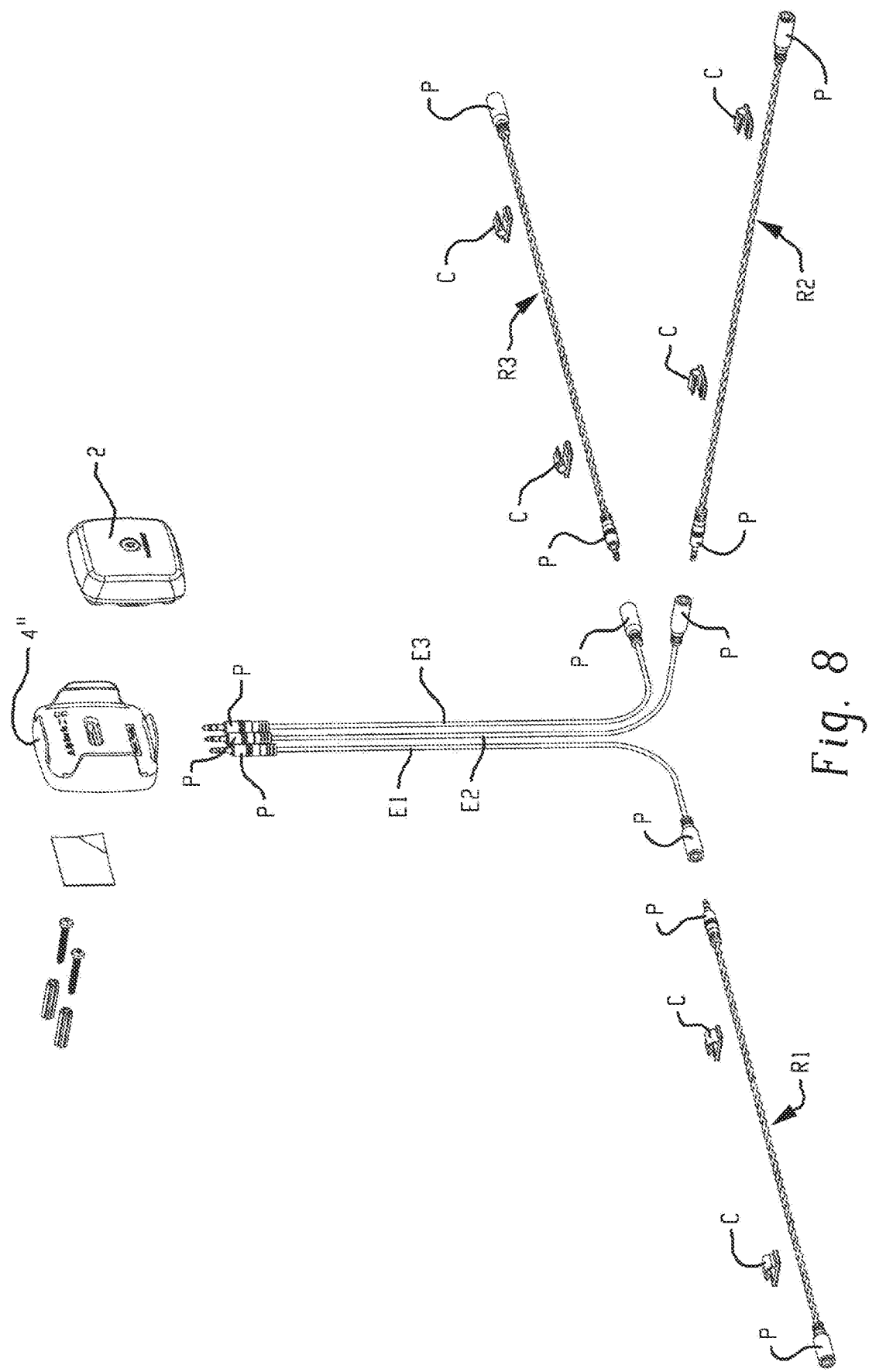
FIG. 8 is a perspective exploded view of another exemplary leak detector and wall bracket system in accordance with the present disclosure.
Figure 9:
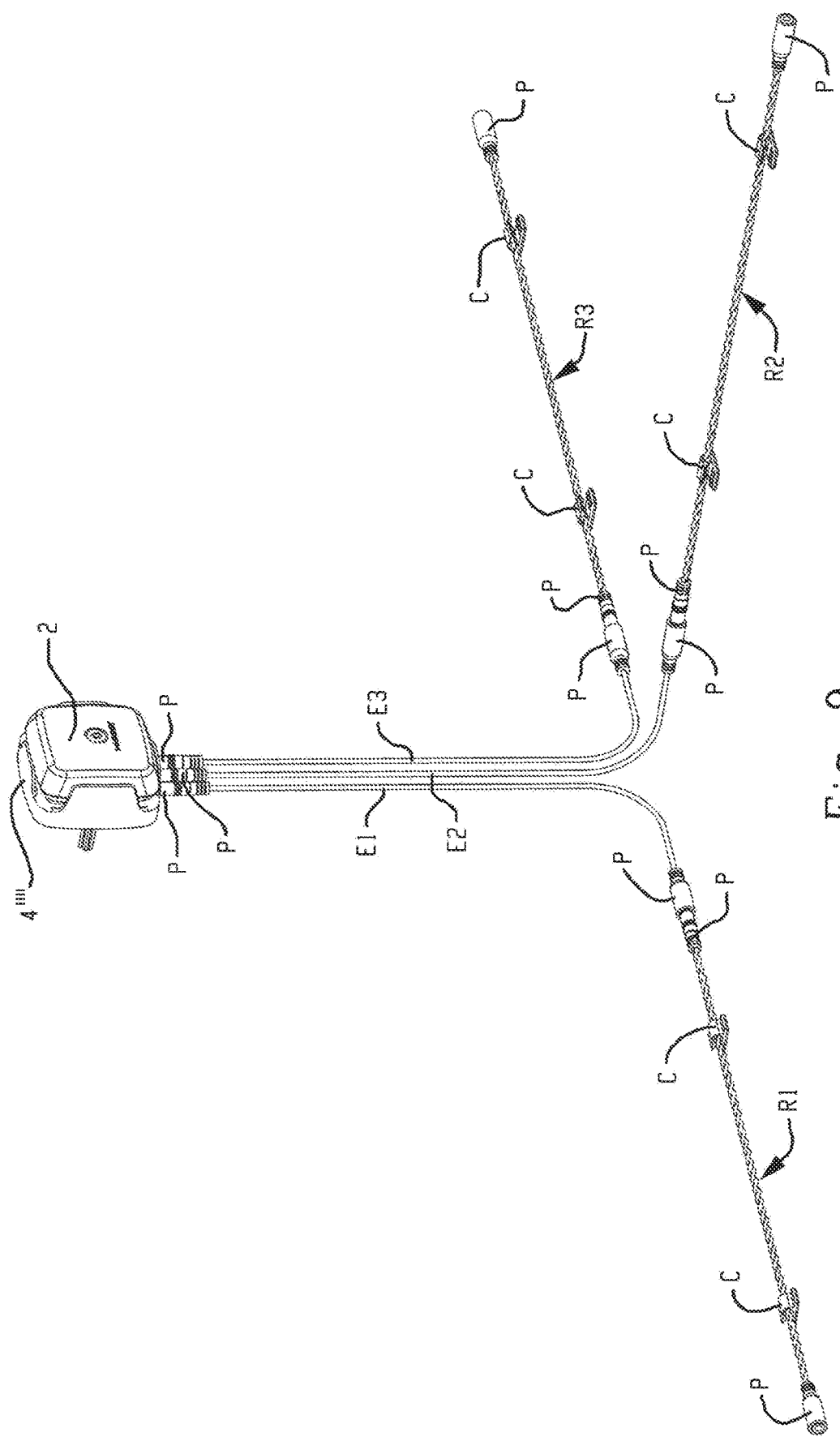
FIG. 9 is an assembled view of the system of FIG. 8.

FIGS. 8 and 9 illustrate one such exemplary embodiment wherein a leak detector having a plurality of leak detection ropes is configured to detect leaks in a larger areal extent than a point specific leak detector. In this embodiment, a leak detector 2 is shown in a wall bracket 4" having three ports (not shown) for connecting to leak detection ropes R1/R2/R3. Each of leak detection ropes R1/R2/R3 are wired in parallel with the electrodes E1/E2 of the leak detector 2 when the leak detector 2 is mechanically coupled to the wall bracket 4". Any one of the leak detection ropes R1/R2/R3 can trigger the leak detector 2. Optional extension cables E1/E2/E3 can be used to extend the reach of the leak detection ropes R1/R2/R3 from the leak detector 2. The leak detection ropes R1/R2/R3 and extension cables E1/E2/E3 in this embodiment include male and female coaxial plug connectors (e.g., 3.5 mm jack) for electrically coupling with each other and with the ports of the leak detector 2. As will be appreciated, any number and/or combination of leak detection ropes R1/R2/R3 and extension cables E1/E2/E3 can be connected in end-to-end fashion to achieve a wide variety leak detector layouts. In addition, any suitable electrical connector or coupling device can be used. Leak rope clips C can also be provided for anchoring the leak detection ropes R1/R2/R3 and/or the extension cables E1/E2/E3 to a surface, such as a floor, wall or baseboard, etc. In some embodiments, both point style and rope style leak detection sensors can be connected to the same leak detector 2.

The leak detector 2 of any embodiment can include an orientation sensor to detect whether the leak detector is in a horizontal position (e.g., placed on a floor or similar surface) or in a vertical position (e.g., in the wall bracket). In some applications, the leak detector can communicate information about its state of use to a hub or other receiver. This enables a user to identify which sensors are being used in conjunction with remote probes via the wall bracket. This can help facilitate system setup and can allow a user to more accurately respond to a leak notification.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:
1. A leak detector system for detecting leaks comprising:
a leak detector having first and second electrodes, the leak detector configured to generate an alert when moisture is detected by the electrodes or when moisture is detected by a remote probe electrically coupled to the first and second electrodes;

a wall bracket mountable to a surface, the wall bracket having a body with first and second terminals supported on the body, and a receptacle for receiving the leak detector; and wherein the first and second terminals of the wall bracket and the first and second electrodes of the leak detector are electrically coupled when the leak detector is received in the receptacle of the bracket.

2. The leak detector system of claim 1, further comprising at least one remote probe having first and second probe electrodes, wherein the at least one remote probe is electrically coupled to the terminals of the wall bracket, whereby the first and second probe electrodes of the at least one remote probe act as the first and second electrodes of the leak detector when the leak detector is received in the wall bracket.

3. The leak detector system of claim 2, wherein the at least one remote probe is hardwired to the wall bracket.

4. The leak detector system of claim 2, wherein the at least one remote probe is removably coupled to the wall bracket.

5. The leak detector system of claim 4, wherein the at least one remote probe is removably coupled to the wall bracket with mating male and female coaxial jacks.

6. The leak detector system of claim 1, wherein the terminals of the wall bracket are biased in a direction to maintain contact with the electrodes of the leak detector.

7. The leak detector system of claim 6, further comprising first and second spring elements for biasing the terminals in a direction to maintain contact with the electrodes of the leak detector.

8. The leak detector system of claim 1, further comprising a splitter interposed between the wall bracket and the at least one probe, the splitter couplable to at least one additional remote probe.

9. The leak detector of system claim 1, wherein the leak detector includes leak detector circuitry configured to generate the alert when moisture is detected by the electrodes or when moisture is detected by a remote probe electrically coupled to the first and second electrodes, wherein the circuitry includes an orientation sensor for detecting an orientation of the leak detector and generating a signal indicative of said detected orientation, wherein the leak detector circuitry uses the signal to determine whether the leak detector is being used in conjunction with the wall bracket.

10. The leak detector system of claim 1, wherein the wall bracket has a first and second side flanges extending from a base wall of the body on opposite edges thereof, the side flanges and being generally concave, and wherein the leak detector has convex side walls adapted to accommodate by the side flanges when the leak detector is in the receptacle of the wall bracket.

11. The leak detection system of claim 10, wherein a distal end of each side flange is recurved to facilitate alignment and acceptance of the leak detector into the receptacle of the wall bracket.

12. The leak detection system of claim 11, wherein the wall bracket further includes a bottom flange extending from the base wall between the first and second side flanges.

13. A wall bracket for a leak detection system comprising:
a body with first and second terminals supported by the body; and
a receptacle for receiving an associated leak detector of the leak detector system;
whereby the first and second terminals of the wall bracket are configured to electrically couple with first and second electrodes of the associated leak detector when the associated leak detector is received in the receptacle of the wall bracket.

14. The wall bracket of claim 13, further comprising at least one remote probe having first and second probe electrodes, wherein the at least one remote probe is electrically coupled to the terminals of the wall bracket, whereby the first and second probe electrodes of the at least one remote probe act as the first and second electrodes of the associated leak detector when the leak detector is received in the wall bracket.

15. The wall bracket of claim 14, wherein the terminals of the wall bracket are biased by spring elements in a direction to maintain contact with the electrodes of the associated leak detector.

16. The wall bracket of claim 13, wherein the wall bracket has a first and second side flanges extending from a base wall of the body on opposite edges thereof, the side flanges being generally concave.

17. The wall bracket of claim 16, wherein the wall bracket further includes a bottom flange extending from the base wall between the first and second side flanges.

18. A method of installing a leak detection system comprising:
mounting a wall bracket to a surface, the wall bracket having a body with first and second terminals supported on the body, and a receptacle for receiving a leak detector;
coupling first and second electrodes of a leak detector to the terminals of the wall bracket by inserting the leak detector into the receptacle of the wall bracket; and
positioning a remote probe connected to the wall mount in a location for detecting moisture in said location, the remote probe having first and second probe electrodes;
wherein the at least one remote probe is electrically coupled to the terminals of the wall bracket, whereby the first and second probe electrodes of the at least one remote probe act as the first and second electrodes of the associated leak detector.

* * * * *